(12) United States Patent
Sakamoto et al.

(10) Patent No.: US 7,907,505 B2
(45) Date of Patent: *Mar. 15, 2011

(54) CODE DISK WITH A PLURALITY OF TRACKS HAVING DIFFERENT PATTERNS

(75) Inventors: Masahiko Sakamoto, Tokyo (JP); Katsutoshi Kamakura, Tokyo (JP); Masahiro Otani, Tokyo (JP); Yasushi Kawashima, Tokyo (JP); Isamu Higashioka, Tokyo (JP); Masaru Imaizumi, Tokyo (JP); Osamu Murakami, Tokyo (JP); Koichi Sugimoto, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/564,374

(22) Filed: Sep. 22, 2009

(65) Prior Publication Data

US 2010/0009072 A1    Jan. 14, 2010

Related U.S. Application Data

(62) Division of application No. 11/706,349, filed on Feb. 15, 2007, now Pat. No. 7,612,331, which is a division of application No. 10/334,222, filed on Dec. 31, 2002, now Pat. No. 7,193,962.

(30) Foreign Application Priority Data

Jan. 21, 2002 (JP) .................................. 2002-011194
Oct. 31, 2002 (JP) .................................. 2002-318158

(51) Int. Cl.
  *G11B 7/24* (2006.01)
  *G11B 7/26* (2006.01)
(52) U.S. Cl. ................ 369/277; 369/275.4; 250/231.18; 428/64.4

(58) Field of Classification Search .................. 369/277, 369/275.4, 47.1, 13.05, 275.3, 59.18, 47.17, 369/95, 120, 121, 44.28, 275.1, 280; 250/231.16, 250/231.13, 237 G, 231.18; 428/64.1, 64.4
See application file for complete search history.

(56) References Cited

U.S. PATENT DOCUMENTS 4,757,196 A    7/1988    Yamada et al.
(Continued)

FOREIGN PATENT DOCUMENTS

| JP | 62-003616 A | 1/1987 |
| JP | 62-005127 A | 1/1987 |
| JP | 4-145326   | 5/1992 |

(Continued)

OTHER PUBLICATIONS

Japanese Office Action of JP 2005-107752, dated Oct. 21, 2008.

*Primary Examiner* — Ali Neyzari
(74) *Attorney, Agent, or Firm* — Buchanan Ingersoll & Rooney PC

(57) ABSTRACT

A code disk for a high-resolution encoder that can detect an absolute position and a method for manufacturing a mold to produce the code disk are provided. The code disk is formed by using transparent substrate. The code disk includes a plurality of tracks provided on the transparent substrate and an area provided between the plurality of tracks. Each surface of the plurality of tracks has a different pattern. A level of the area is different from that of the each surface of the plurality of tracks. The method for manufacturing the mold includes steps of processing a plurality of tracks with a flat surface on material; processing an area with a level different from that of each surface, between the plurality of tracks; forming different patterns on the each surface; plating the first material; and peeling plating from the first material to obtain a mold.

16 Claims, 8 Drawing Sheets

U.S. PATENT DOCUMENTS

| | | | |
|---|---|---|---|
| 4,820,918 A | 4/1989 | Igaki et al. | |
| 6,018,510 A | 1/2000 | Abe et al. | |
| 6,093,928 A | 7/2000 | Ohtomo et al. | |
| 6,803,560 B1 | 10/2004 | Okumura et al. | |
| 7,193,962 B2 | 3/2007 | Sakamoto et al. | |
| 7,612,331 B2 * | 11/2009 | Sakamoto et al. | 250/237 G |

FOREIGN PATENT DOCUMENTS

| | | |
|---|---|---|
| JP | 08-229955 | 9/1996 |
| JP | 11-23321 A | 1/1999 |
| JP | 11-031334 A | 2/1999 |
| JP | 2000-352527 A | 12/2000 |
| JP | 2001-227989 A | 8/2001 |

* cited by examiner

CODE DISK WITH A PLURALITY OF TRACKS HAVING DIFFERENT PATTERNS

CROSS REFERENCE TO RELATED APPLICATIONS

This application is a divisional application of application Ser. No. 11/706,349, filed Feb. 15, 2007, which is a divisional application of application Ser. No. 10/334,222, filed Dec. 31, 2002, now U.S. Pat. No. 7,193,962.

BACKGROUND OF THE INVENTION

1. Field of the Invention

The present invention relates to a high-resolution optical encoder that detects positions in a servo system.

2. Description of the Background Art

Encoders have been popularly used as displacement sensors in servo systems such as numerical control (NC) machine tools. Encoders detect rotation of motors, linear motion, and position, angle, velocity, and other displacement of a body in rotary motion. Encoders generally detect displacement information either magnetically or optically.

Optical encoders has a housing that houses a light source and a light receiving section which receives light from the light source, and an optical scale (i.e. a code disk) connected to the rotating body as a moving object. For example, an optical rotary encoder that detects rotation of a rotating body has a rotary disk (a code disk) connected to the rotating body. On the code disk, slit-form light transmitting section and light shielding section are periodically arranged.

FIG. 12 is a cross-sectional view of detection section of optical encoder. The optical encoder has code disk 120, light source 122, and light receiving section 123. Code disk 120 is located between light source 122 and light receiving section 123. Code disk 120 has a predetermined pattern 121 obtained by vapor-depositing Cr to a glass sheet, and selectively receives light flux 124 through pattern 121 to detect a position. This kind of code disk 120 has problems such as easy to break, heavy, and high cost.

As against such problems, code disks formed with plastics have been used (See Japanese Laid-open Patent Publication No. 11-23321). FIG. 13A shows a cross-sectional view of code disk 130 formed with plastics. Substrate 132 of code disk 130 has a recess, in which specified patterns that optically modulate an incident light in a specified direction are formed. FIG. 13B shows an enlarged cross-sectional view of substrate 132. Pattern 136 is formed on a bottom surface of recess 134 of substrate 132. Code disk 130 is rotated by rotary shaft P and detects rotation based on the incident light from a light source detected via pattern 136 of recess 134.

Because code disk 130 shown in FIG. 13A has single pattern 136 on the whole flat bottom surface of recess 134, that is, it only has a single track, code disk 130 can only detect an amount of relative displacement. With this configuration, the code disk is unable to determine an absolute position in the case that power supply of servo system is turned off or reset.

SUMMARY OF THE INVENTION

It is the object of the present invention to provide a high-resolution encoder code disk that can detect an absolute position.

A code disk according to the present invention is formed by using transparent substrate. The code disk includes a plurality of tracks provided on the transparent substrate and an area provided between the plurality of tracks. Each surface of the plurality of tracks has a different pattern. A level of the area is different from that of the each surface of the plurality of tracks.

Further, an encoder of the present invention includes a housing which houses a light source which irradiates with light and a light receiving section which receives the light from the light source; and the code disk as described above. The disk is provided between the light source and the light receiving section and which detects a position of an object by transmitting and reflecting light irradiated from the light source. According to the above arrangements, the above object can be achieved.

A method for manufacturing a mold to produce a code disk includes steps of processing a plurality of tracks with a flat surface on material; processing an area with a level different from that of each surface, between the plurality of tracks; forming different patterns on the each surface; plating the first material; and peeling plating from the first material to obtain a mold. According to the above arrangements, the above object can be achieved.

Another method for manufacturing a mold to produce a code disk includes steps of plating a base material; processing a plurality of tracks with a flat surface on a plated section of the base material; processing an area with a level different from that of each surface, between the plurality of tracks; and forming different patterns on the each surface to obtain a mold. According to the above arrangements, the above object can be achieved.

The code disks for encoders and their molds according to the present invention have a plurality of tracks with different patterns on each of the surfaces. According to this configuration, track intervals can be reduced for downsizing. This kind of code disks for an encoder can detect an absolute position of a moving object at high resolution. The present invention further provides a manufacturing method of such encoder code disks and their molds.

BRIEF DESCRIPTION OF THE DRAWINGS

This and other objects and features of the present invention will become clear from the subsequent description of a preferred embodiment thereof made with reference to the accompanying drawings, in which like parts are designated by like reference numerals and in which.

DETAILED DESCRIPTION OF THE PREFERRED EMBODIMENTS

Figure 12:
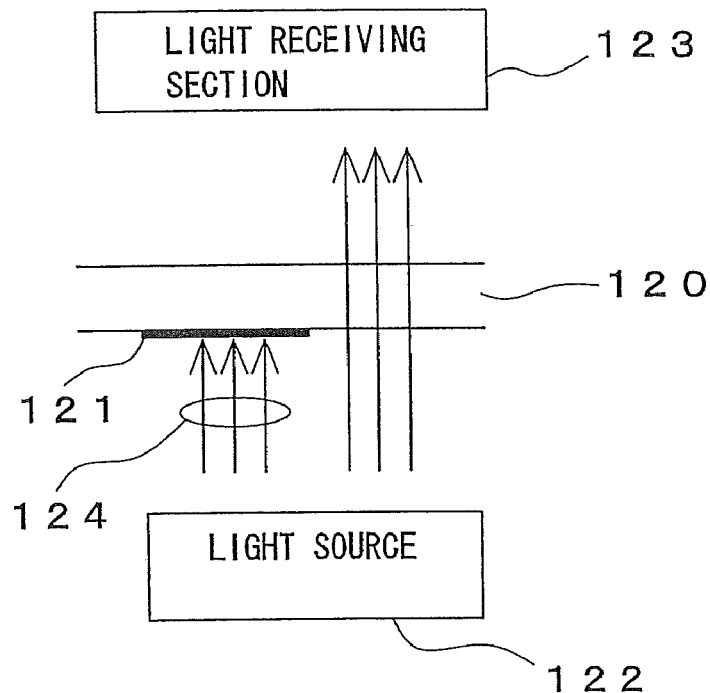
FIG. 12 is a cross-sectional view of a detection section of an optical encoder having a code disk, a light source, and a light receiving section.
Figure 13A:
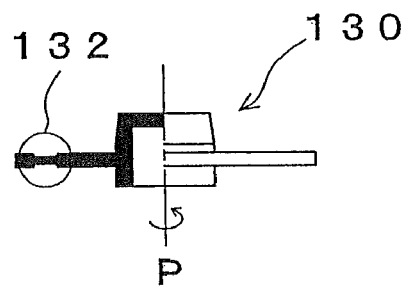
FIG. 13A is a cross-sectional view of a code disk formed with plastics.
Figure 13B:
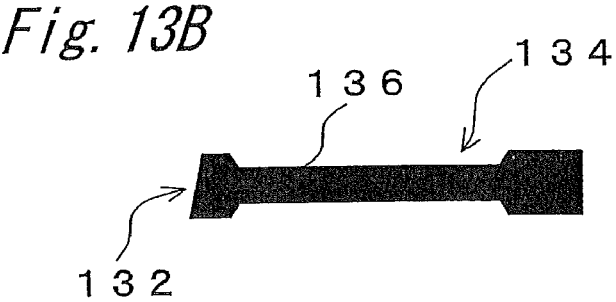
FIG. 13B is a view showing an enlarged cross-sectional view of a substrate.

Referring now to the drawings attached, preferred embodiments of the present invention will be described. In the present embodiments, code disks used primarily for optical encoders will be described. The optical encoders referred to herein are sensors that optically detect rotation of motors, linear motion, and position, angle, velocity, and other displacement of a body in rotary motion. As optical encoders, rotary encoders used for an object in rotary motion, linear encoders used for an object in linear motion are known. Optical encoders has a housing that houses a light source and a light receiving section which receives a light from the light source, and a code disk connected to the rotating body as a moving object. For example, in FIG. 12, code disk 120, light source 122, and light-receiving section 123 of the optical encoder are shown. Code disk 120 is located between light source 122 and light-receiving section 123.

Embodiment 1

Figure 1A:
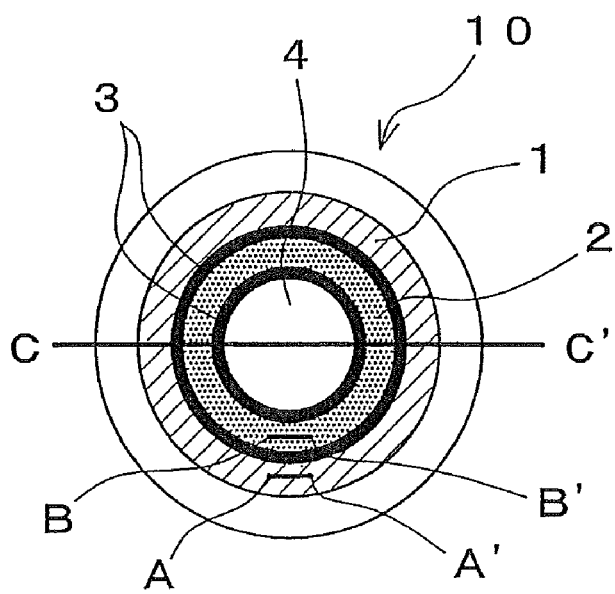
FIGS. 1A to 1D are diagrams showing a configuration of a code disk with two tracks for a rotary encoder according to embodiment 1.
Figure 1B:
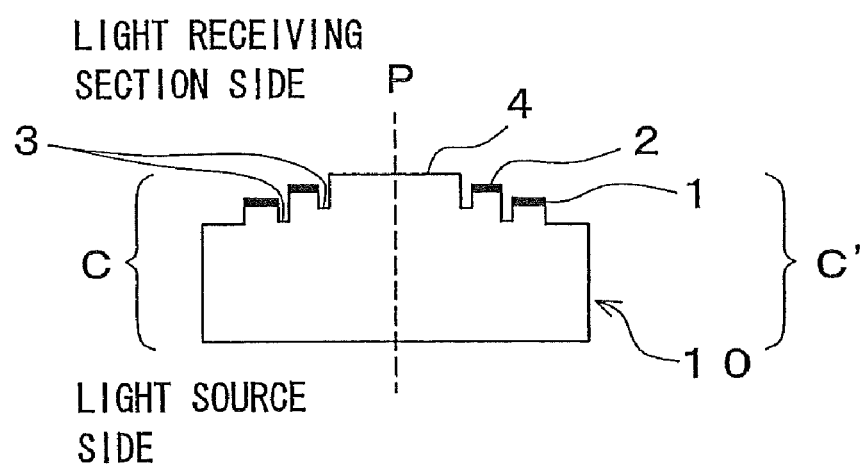
Figure 1C:
Figure 1D:

Now, description is made on a code disk of an optical encoder according to embodiment 1. First of all, in order to detect an absolute position of an object at high resolution, a plurality of tracks that have different patterns are required. The term "track" means a zoned area that allows light flux from light source to pass. In the present embodiment, two tracks are provided in the code disk. FIGS. 1A to 1D are diagrams showing a configuration of code disk 10 for a rotary encoder provided with two tracks according to the present embodiment (hereinafter called as "code disk"). The optical rotary encoder which detects rotation of a rotating body has a rotary disk (the code disk) connected to the rotating body. On code disk 10, slit-form light transmitting section and light shielding section are periodically arranged. Code disk 10 is used for detecting the absolute position of an rotating angle and is made from transparent resin material such as polycarbonate. FIG. 1A is a top view, FIG. 1B is a cross-sectional view, and FIGS. 1C and 1D are fragmentary sectional views.

Referring now to FIG. 1A, code disk 10 is a circular disk body with two types of tracks 1, 2 and flat section 4. Tracks 1, 2 and flat section 4 are formed concentrically, respectively, and are separated by concentric recesses 3. On respective tracks 1, 2, different patterns defined by grooves formed in V-shape (hereinafter called as "V-groove") are formed. FIGS. 1D and 1C show a cross-sectional view taken on line A-A' of track 1 and a cross-sectional view taken on line B-B' of track 2, respectively. Each V-groove of cross sections is a reflecting section that reflects light according to the principle later discussed. The flat surface between V-grooves is a transmitting section that transmits light. The each V-groove pattern of tracks is formed in radial directions.

FIG. 1B is a cross-sectional view on line C-C' shown in FIG. 1A. As clear from FIG. 1B, it can be said that tracks 1, 2 and flat section 4 are formed in protruded form on code disk 10. Top surface of track 2 is located at a position higher than that of track 1. In addition, flat section 4 with no pattern is located at still higher position, i.e., the thickest portion of the disk 10. Note that, on the side where tracks 1 and 2 are provided, a light-receiving section is arranged. A light source is provided on the opposite side. Code disk 10 rotates around rotating shaft P and passes or reflects light flux from the light source.

Figure 2:
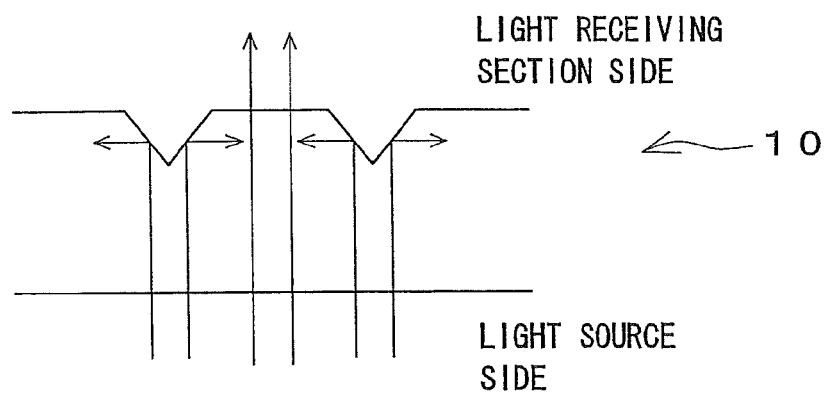
FIG. 2 is a cross-sectional view of a V-groove section of the tracks.

The principle of passing or reflecting light flux will be described more in detail. FIG. 2 is a cross-sectional view of V-grooves section of a track. The light from light source (not illustrated) that reaches the V-groove section is totally internal-reflected and does not transmit to the light receiving section side of code disk 10. On the other hand, the light from light source that reaches the flat section between V-grooves transmits and enters the light receiving section (not illustrated). By forming such V-groove patterns, the light can be selectively transmitted and received at the light-receiving section (not illustrated).

Figure 3A:
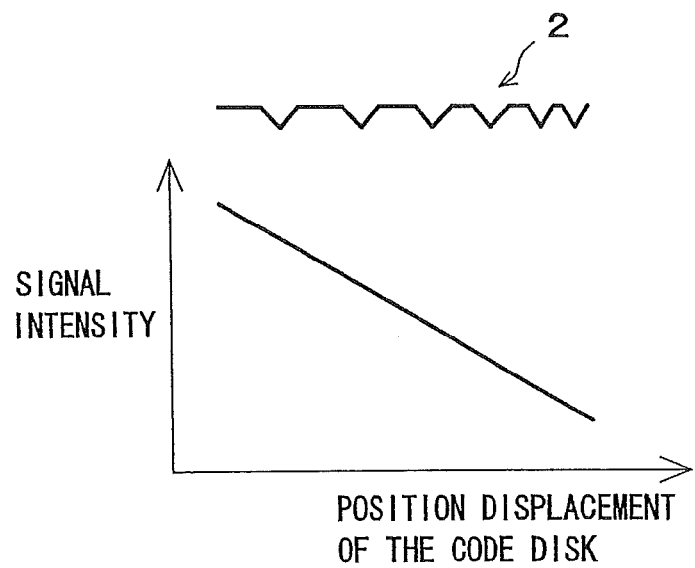
FIGS. 3A and 3B are graphs showing relationships between signal intensity and position displacements of the code disk, which vary according to each shape of the V-groove of the two tracks.
Figure 3B:
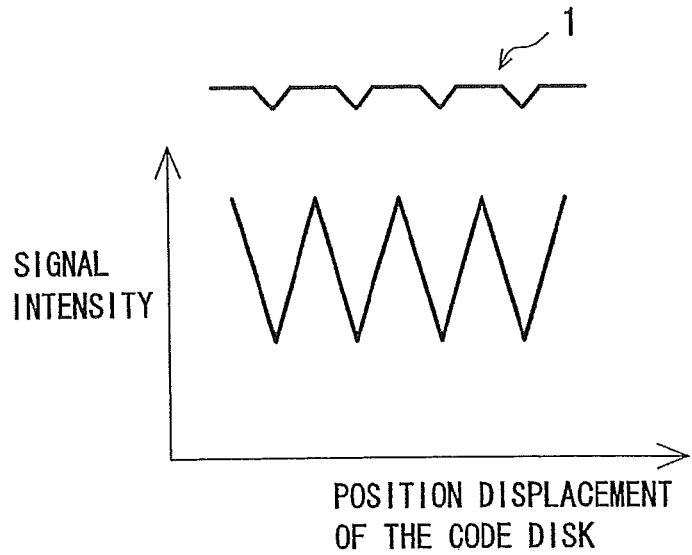

FIG. 3A is a graph showing relationships between signal intensity and position displacements of the code disk, which vary according to the V-groove shape of track 2. As illustrated, in track 2, changes of transmitted light quantity can be detected according to variation of pitches of the V-groove. By forming patterns in which the pitches of the V-groove vary throughout the whole periphery of code disk, the absolute position can be detected. On the other hand, FIG. 3B is a graph showing relationships between signal intensity and position displacements of the code disk, which vary according to the V-groove shape of track 1. On track 1, V-grooves with a specified pitch are formed throughout the whole periphery of code disk. By providing the light receiving section for receiving the transmitting light from track 1 with light-shielding slits having the same pitch, changes of amount of the transmitted light, which correspond to changes of the pitch, can be detected. That is, by combining and processing the two types of detected signals, detection of the absolute position at high resolution can be achieved.

Now, the description of detecting the position will be described. The patterns carved in track 2 enables generation of a signal that varies levels according to each position of the code disk during a rotation. By detecting the signal, a rough absolute position can be detected. The pattern carved in track 1 enables a generation of a signal that oscillates in a specified number of times (for example, 16 times) per a rotation. By arranging a light-receiving element with the same pitches as those of track 1 at the light-receiving section, it is possible to obtain signals shown in, for example, FIG. 3B according to a motion of the code disk. With the signal based on patterns of track 2, the rough absolute position is detected, and furthermore, by the signal based on patterns of track 1, the position can be detected at still higher accuracy. For example, if numbers of oscillation is 16 times, the position can be detected at about 16 times higher accuracy.

By providing flat section 4 (FIG. 1) at the uppermost section, i.e. the thickest portion, of code disk 10, it is possible to protect pattern sections of tracks 1 and 2 at the time of assembly, and the stable position information can be obtained without damaging the pattern sections.

Figure 4A:
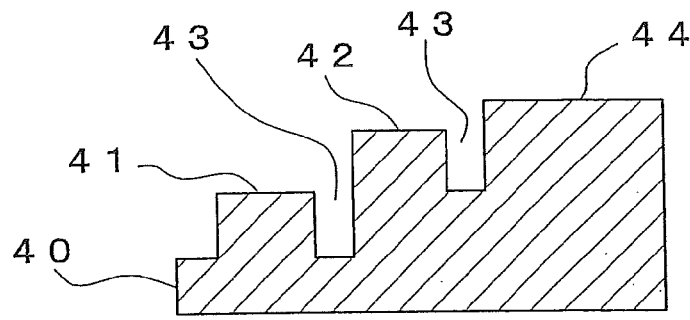
FIG. 4A is an illustration of base material with a code disk form processed.
Figure 4B:
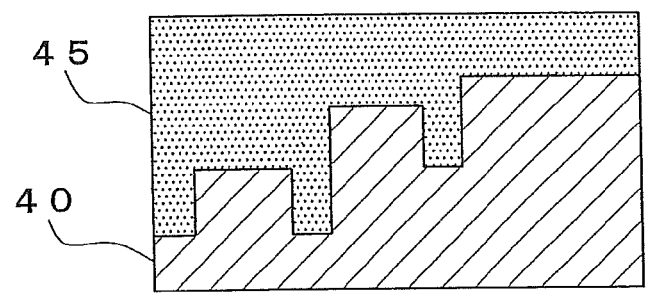
FIG. 4B is an illustration of the processed base material and a plated section provided on it.
Figure 4C:
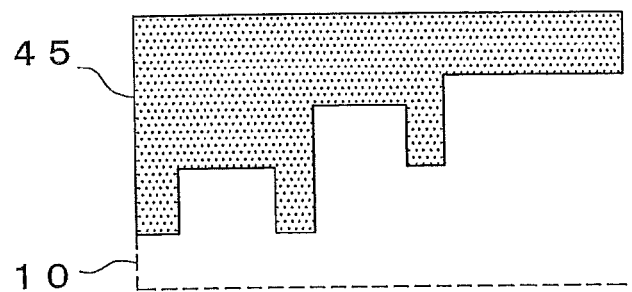
FIG. 4C is an illustration of the plated section peeled from the base material.

Next discussion will be made on the manufacturing method of code disk 10 (FIG. 1). Code disk 10 (FIG. 1) is fabricated by injection-molding of resin. In injection-molding, mold material is required. FIGS. 4A to 4C are diagrams showing manufacturing process of mold material 45. The manufacturing process of mold material 45 is broadly classified into (a) process for processing a shape of code disk 10 of base material, (b) process for plating the processed base material, and (c) process for peeling the plating from base material. The peeled plating becomes the mold material.

Figure 5:
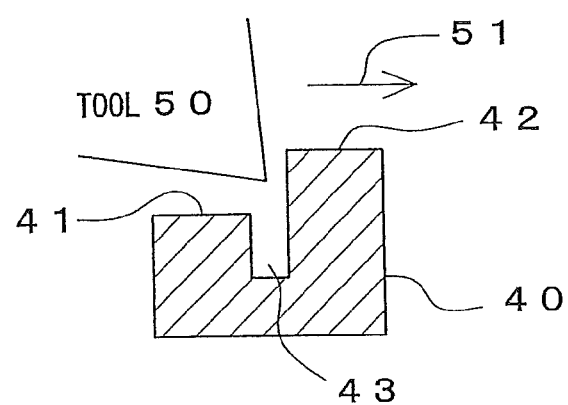
FIG. 5 is a diagram showing a position of a tool at the time of processing.

FIG. 4A shows base material 40 with the form of code disk 10 processed. For the base material, brass are used, for example. To explain the process, first of all, ring sections 41, 42 that correspond to track 1, track 2, respectively, are processed evenly. The level difference is provided in rings. That is, a top surface of ring section 42 is located higher than a top surface of ring section 41. Each top surface is a mirror surface with small surface roughness. Adjacent to each ring 41, 42, concentric recess 43 is formed. Then, V-grooves are processed on the top surfaces of ring sections 41, 42. Since patterns of tracks 1 and 2 differ, V-groove patterns on top surfaces of ring sections 41, 42 differ. Now, the reason why level difference is provided in ring sections 41, 42 is because a tool does not interfere with the other ring section when forming V-groove patterns on the top surface of one ring section. FIG. 5 is a diagram showing a position of tool 50 during processing. As understood from the figure, tool 50 can process ring section 42 without interfering with ring section 41 due to the level difference between ring sections 41 and 42. In addition, providing recess 43 between ring sections allows chips to discharge while V-groove is being processed and can suppress burrs.

Next, FIG. 4B shows base material 40 after processing and plated section 45 provided on the base material. To plated section 45, Ni plating called electroform-plating is carried out. Plating is carried out until sufficient thickness is obtained with respect to the level difference of ring section, the concentric recesses, and depth of the V-groove of each ring section.

FIG. 4C show plated section 45 peeled from the base material. This plated section is used for manufacturing code disk 10 as mold material 45. Needless to say, mold material 45 is an inverted product with respect to base material 40. Injecting transparent resin material into mold material 45 enables us to obtain code disk 10 (FIG. 1).

According to the above-mentioned manufacturing method, a small-size and high-accuracy code disk can be obtained by providing recesses between tracks and a plurality of tracks whose levels are different. In addition, since code disk 10 can be manufactured by injection-molding of resins after the mold is fabricated, the manufacturing cost can be reduced.

Embodiment 2

Figure 6A:
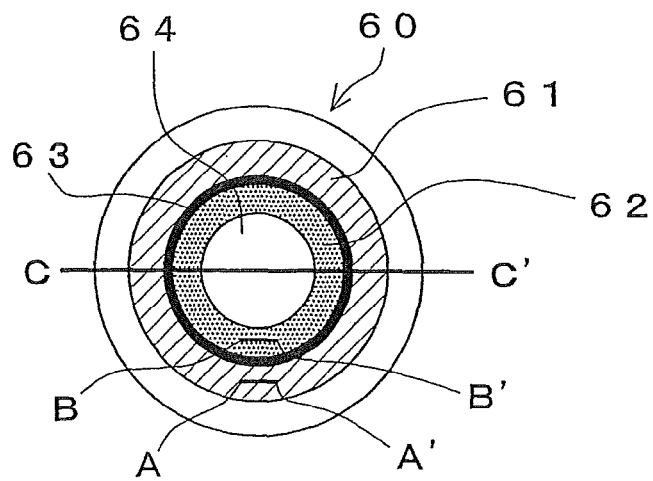
FIGS. 6A to 6D are diagrams showing a configuration of a code disk with two tracks according to embodiment 2.

In embodiment 2, same as embodiment 1, description is made on a code disk for the rotary encoder for detecting an absolute position on rotating angle of the code disk (hereinafter called the "code disk"). Code disk has a plurality of tracks with different patterns and is formed with transparent resin material such as polycarbonate. Each of FIGS. 6A to 6D is a diagram showing a configuration of code disk 60 with two tracks according to the embodiment. Code disk 60 is used for detecting the absolute position on rotating angle, and is formed with transparent resin material. FIG. 6A is a top view, FIG. 6B a cross-sectional view, and FIGS. 6C and 6D fragmentary cross-sectional views.

The difference between code disk 60 shown in FIGS. 6A to 6D and code disk 10 (FIG. 1) is in that recesses and protrusions of code disk 10 (FIG. 1) are inverted in code disk 60. Now, this is specifically described.

Referring to FIG. 6A, code disk 60 is a circular plate having two types of tracks 61, 62 and a flat section 64. Tracks 61, 62, and flat section 64 are formed concentrically, respectively, and are separated with concentric protrusion 63. That is, protrusion 63 protrudes with respect to tracks 61 and 62. To tracks 61, 62, different patterns are formed by protrusions formed in a V-shape (hereinafter called the "V-protrusion"), respectively. FIGS. 6D and 6C show profiles of A-A' cross-section of track 61 and B-B' cross-section of track 62. The V-protrusion of each cross section is a reflecting section which reflects light by the principle later discussed. The flat surface between V-protrusions is a transmitting section that transmits light. V-protrusion patterns of each track are formed in radial directions.

Figure 6B:
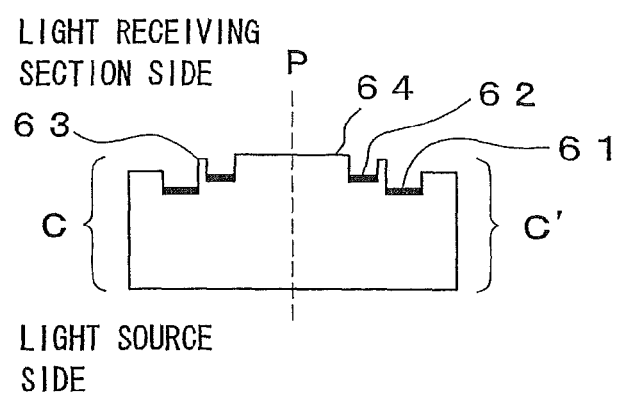
Figure 6C:
Figure 6D:

FIG. 6B is a cross-sectional view on line C-C' shown in FIG. 6A. As clear from FIG. 6B, it can also be said that tracks 61, 62 are formed as recesses of code disk 60. A top surface of track 62 is located at a place higher than that of the top surface of track 61. Flat section 4 free of any pattern is located at the highest level, i.e., the thickest portion of the disk. Note that, on the side where tracks 61 and 62 are provided, a light-receiving section is arranged. A light source is provided on the opposite side. Code disk 60 rotates around rotating shaft P and passes or reflects light flux from the light source.

Figure 7:
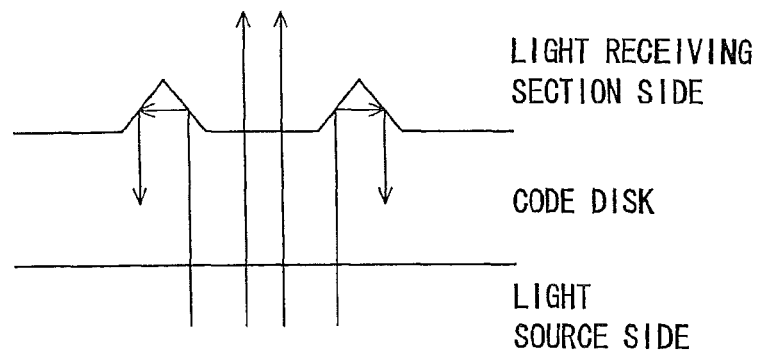
FIG. 7 is a cross-sectional view showing V-protruded portions of the tracks.

The principle of passing or reflecting light flux will be described more in detail. FIG. 7 is a cross-sectional view of V-protrusions of a track. The light from the light source (not illustrated) that reaches the V-protrusion section is totally internal-reflected and does not transmit to the light receiving section side of code disk 60. On the other hand, the light from light source that reaches the flat section between V-protrusions transmits and enters the light receiving section (not illustrated). By forming such V-protrusion patterns in this way, the light can be selectively transmitted and received at the light-receiving section (not illustrated).

Figure 8A:
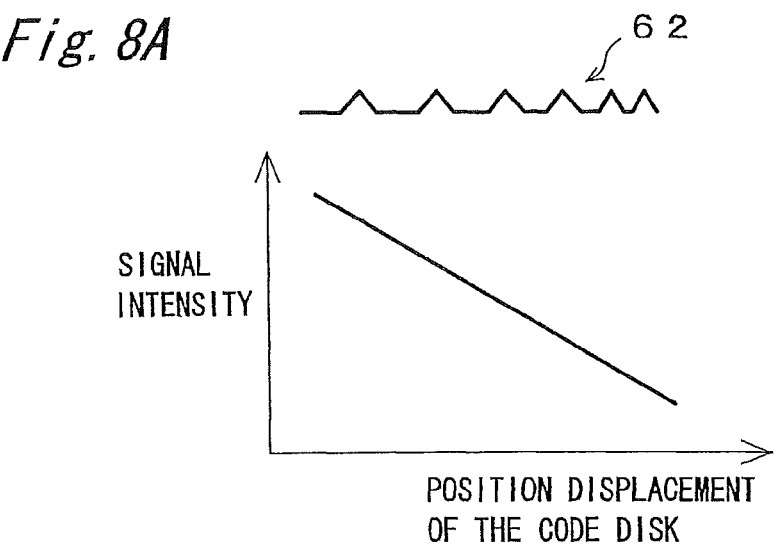
FIGS. 8A and 8B are graphs showing relationships between signal intensity and position displacements of the code disk, which vary according to each shape of the V-protrusion of the two tracks.
Figure 8B:
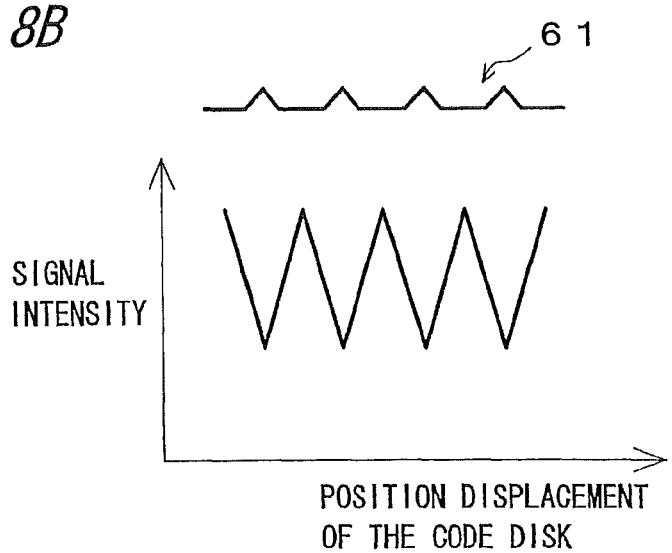

FIG. 8A is a graph showing relationships between signal intensity and position displacements of the code disk, which vary according to V-protrusion pitches of track 62. On the other hand, FIG. 8B is a graph showing relationships between signal intensity and positional displacements of the code disk, which vary according to V-protrusion form of track 61. What differs in FIGS. 8A and 8B from FIGS. 3A and 3B is, in general, the difference of V-protrusion or V-groove. Consequently, the description of FIGS. 3A and 3B should be read accordingly, and the description is therefore omitted. In addition, it is also the same as embodiment 1 that tracks can be protected by providing flat section 64 at the uppermost section (thickest portion) of code disk 60 and stable position information can be obtained.

Figure 9:
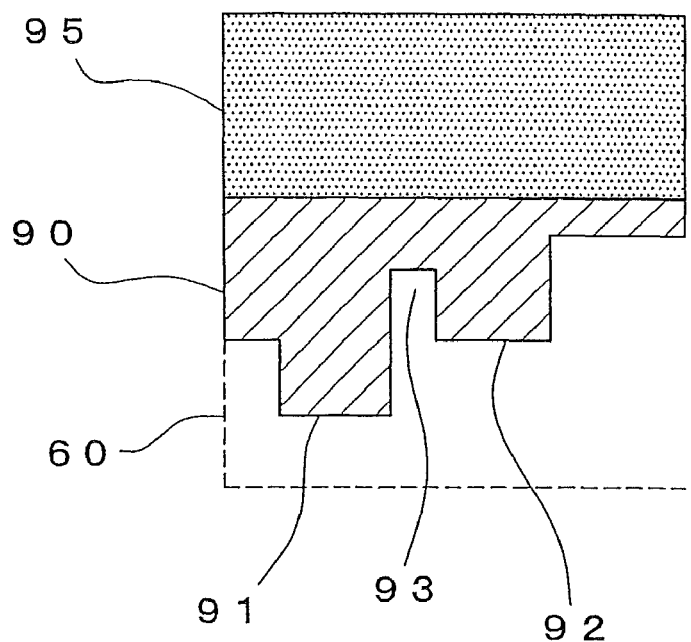
FIG. 9 is a diagram showing mold base material and a mold required for injection molding.

Next discussion will be made on the manufacturing method of code disk 60 (FIGS. 6A to 6D). Code disk 60 (FIGS. 6A to 6D) is fabricated by injection-molding of resins. FIG. 9 is a diagram showing mold base material 95 and mold 90 required for injection-molding. First of all, Cu-plating is carried out on mold base material 95. For mold base material, steels are popularly used. Thereafter, on the surface opposite to mold base material 95 of Cu-plated section 90, ring sections 91, 92 that correspond to track 61, track 62 (FIGS. 6A to 6D), respectively, are processed evenly. The level difference is provided in rings. More specifically, the surface of ring section 92 is located closer to mold base material 95 than the surface of ring section 91. Each surface is finished into a mirror surface with small surface roughness. Adjacent to each ring 91, 92, a concentric recess 93 is formed. Recess 93 is the portion which will become protrusion 63 (FIGS. 6A to 6D) in moldings. Then, a V-groove is processed on the Cu-placed surface. The V-groove processes will become a V-protrusion in moldings. Since patterns of track 61 and track 62 differ, V-groove patterns on surfaces of ring sections 91, 92 differ.

Figure 10:
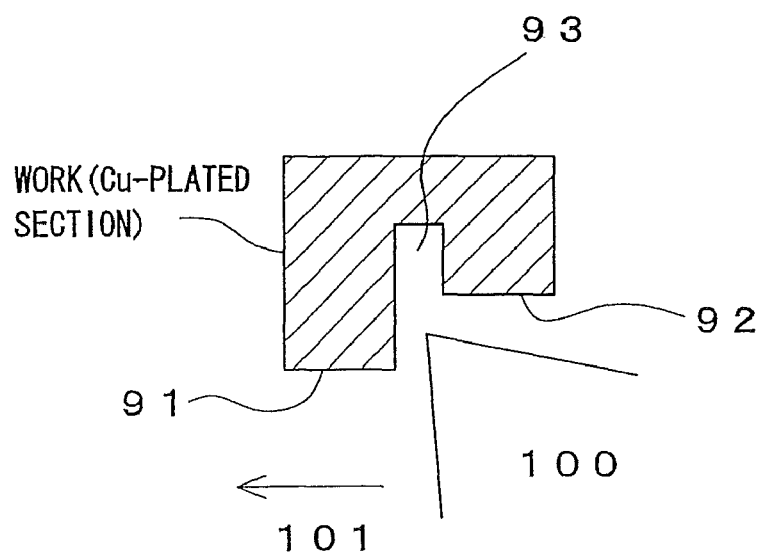
FIG. 10 is a diagram showing a position of a tool at the time of processing.

Now, the reason why level difference is provided in ring sections 91, 92 (FIG. 9) is because a tool does not interfere with the other ring section when forming V-groove patterns on the surface of one ring section. FIG. 10 is a diagram showing the position of tool 100 during processing. As clear from the drawing, tool 100 can process ring section 91 without interfering with ring section 92 due to the level difference between ring sections 91 and 92. In addition, providing recess 93 between ring sections allows chips to discharge while V-groove is being processed and can suppress burrs.

After V-groove processing, NiP is plated with thickness approximately 0.5 µm throughout the whole surface for oxidation prevention and extended life at the time of molding.

Note that mold 90 may be configured not by Cu but by NiP plating. In such event, the latter plating, that is, NiP plating of the whole surface is no longer required.

According to the above-mentioned manufacturing method, a small-size and high-accuracy code disk can be obtained by providing protrusions between tracks and a plurality of tracks whose levels are different. In addition, since code disk 60 can be manufactured by injection-molding of resins after the mold is fabricated, the manufacturing cost can be reduced.

Embodiment 3

In embodiments 1 and 2, optical rotary encoders with a plurality of tracks having different patters are described. In embodiment 3, an optical linear encoder with a plurality of tracks having different patterns will be described. An optical linear encoder is used as a sensor that detects displacement such as position, velocity of a body in linear motion by an optical method.

Figure 11A:
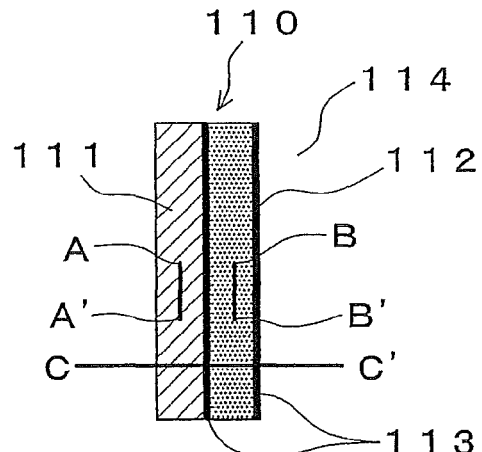
FIGS. 11A to 11D are diagrams showing a configuration of code disk for a linear encoder having two tracks according to the present embodiment.

FIGS. 11A to 11D are diagrams showing a configuration of code disk 110 for a linear encoder having two tracks according to the present embodiment (hereinafter called as "code disk"). Code disk 110 is used for detecting an absolute position of an object in linear motion and is formed with transparent resin material such as polycarbonate. FIG. 11A is a top view, FIG. 11B a cross-sectional view, and FIGS. 11C and 11D fragmentary sectional views.

Referring now to FIG. 11A, code disk 110 is a rectangular plate body equipped having two types of linear tracks 111, 112 and flat section 114. Each of tracks 111, 112 and flat section 114 is separated by a recess 113. In tracks 111, 112, different patterns are formed by grooves formed in a V-shape (hereinafter called as "V-groove"), respectively. FIGS. 11D and 11C show profiles of cross section on line A-A' of track 1 and cross section on line B-B' of track 2, respectively. Same as embodiment 1, the V-groove of each cross section is a reflecting section that reflects light by the principle later discussed. The flat surface between V-grooves is a transmitting section that transmits light. The V-groove pattern of each track is provided in parallel to C-C' direction.

Figure 11B:
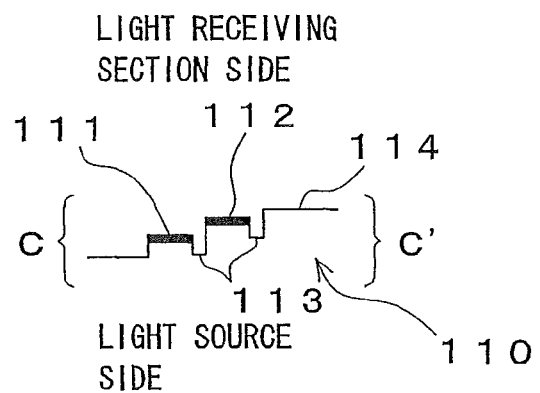
Figure 11C:
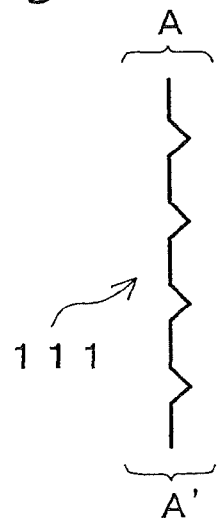
Figure 11D:
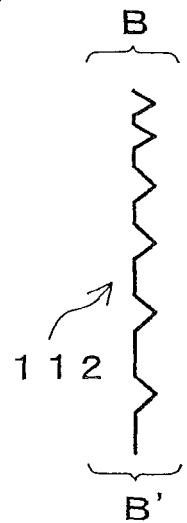

FIG. 11B is a cross-sectional view taken on line C-C' shown in FIG. 11A. As clear from FIG. 11B, it can be said that tracks 111, 112 and flat section 114 are formed protruded on code disk 110. A top surface of track 112 is located at a position higher than a top surface of track 111. Flat section 114 free of any pattern is located at a still higher position, i.e., the thickest portion of the disk. On the side where tracks 111 and 112 are provided, a light receiving section is arranged. A light source is provided on the opposite side.

Since the principle in which light transmits and reflects code disk 110 and relationships between signal intensity and positional displacement of code disk are substantially the same as those described in FIG. 2, FIGS. 3A and 3B, the description will be omitted. Code disk 110 having such configuration can be easily manufactured by fabricating molds in the same method as described in embodiment 1. Since the mold fabricating process is substantially the same as that described with reference to FIGS. 4A to 4C and FIG. 5, the description will be omitted. As a result, the same effects as embodiment 1 can be obtained.

Furthermore, it is possible to obtain a code disk (not illustrated) that modifies code disk 110 by forming V-groove patterns provided in tracks 111 and 112 into V-protrusions or by inverting tracks 111, 112 and flat section 114 and recess 113. Because the principle in which light transmits and reflects code disk 110 and relationships between signal intensity and positional displacement of code disk are substantially the same as those described in FIG. 7 and FIG. 8, the description will be omitted. This kind of code disk can be easily manufactured by fabricating molds in the method same as that of embodiment 2. Since the mold fabricating process is substantially the same as that described with reference to FIG. 9 and FIG. 10, the description will be omitted. As a result, the same effects as embodiment 2 can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a mold which is used for manufacturing a code disk for an encoder, comprising:
   processing a plurality of tracks on a first material, each of the plurality of tracks having a flat surface;
   processing an area between the plurality of tracks, said area separating the plurality of tracks and having a level different from that of each surface of the plurality of tracks;
   forming respectively different patterns on each surface of the plurality of tracks, at least one pattern formed of grooves which vary in pitch through the whole periphery of the code disk;
   plating the first material with the plurality of tracks, the area between the plurality of tracks, and the different patterns formed on each surface of the plurality of tracks; and
   peeling plating from the first material to obtain a mold.

2. The method according to claim 1, wherein the step of forming the different patterns forms V-grooves with different arrangements on the each surface.

3. The method according to claim 1, wherein the step of processing the plurality of tracks processes the plurality of tracks with different levels.

4. A method for manufacturing a mold which is used for manufacturing a code disk for an encoder, comprising:
   plating a base material;
   processing a plurality of tracks on a plated section of the base material, each of the plurality of tracks having a flat surface;
   processing an area between the plurality of tracks, said area separating the plurality of tracks and having a level different from that of each surface of the plurality of tracks;

forming different patterns on each surface of the plurality of tracks between the processed area separating each surface of the plurality of tracks to obtain a mold, at least one pattern formed of grooves which vary in pitch through the whole periphery of the code disk.

5. The method according to claim 4, wherein the step of forming the different patterns forms V-grooves with different arrangements on the each surface.

6. The method according to claim 4, wherein the step of processing the plurality of tracks processes the plurality of tracks with different levels.

7. The method according to claim 1, wherein the step of forming the different patterns forms a pattern formed of grooves having a specified pitch through the whole periphery of the code disk.

8. The method according to claim 4, wherein the step of forming the different patterns forms a pattern formed of grooves having a specified pitch through the whole periphery of the code disk.

9. The method according to claim 1, wherein the area between the plurality of tracks comprises a recess formed between each surface of two adjacent tracks.

10. The method according to claim 9, wherein the recess extends below each surface of the two adjacent tracks, respectively.

11. The method according to claim 1, wherein the area between the plurality of tracks comprises a protrusion formed between each surface of two adjacent tracks.

12. The method according to claim 11, wherein the protrusion extends above each surface of the two adjacent tracks, respectively.

13. The method according to claim 4, wherein the area between the plurality of tracks comprises a recess formed between each surface of two adjacent tracks.

14. The method according to claim 13, wherein the recess extends below each surface of the two adjacent tracks, respectively.

15. The method according to claim 4, wherein the area between the plurality of tracks comprises a protrusion formed between each surface of two adjacent tracks.

16. The method according to claim 15, wherein the protrusion extends above each surface of the two adjacent tracks, respectively.

* * * * *